United States Patent
Nam et al.

(10) Patent No.: US 12,195,616 B2
(45) Date of Patent: Jan. 14, 2025

(54) THERMOPLASTIC RESIN COMPOSITION

(71) Applicant: LG CHEM, LTD., Seoul (KR)

(72) Inventors: Jin Oh Nam, Daejeon (KR); Seung Hun Han, Daejeon (KR); Seong Lyong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 591 days.

(21) Appl. No.: 17/436,525

(22) PCT Filed: Sep. 7, 2020

(86) PCT No.: PCT/KR2020/012074
§ 371 (c)(1),
(2) Date: Sep. 3, 2021

(87) PCT Pub. No.: WO2021/080168
PCT Pub. Date: Apr. 29, 2021

(65) Prior Publication Data
US 2022/0177687 A1  Jun. 9, 2022

(30) Foreign Application Priority Data
Oct. 21, 2019 (KR) .................. 10-2019-0130863

(51) Int. Cl.
*C08L 25/12* (2006.01)
(52) U.S. Cl.
CPC ......... *C08L 25/12* (2013.01); *C08L 2205/035* (2013.01)
(58) Field of Classification Search
CPC .......... C08L 23/12; C08L 51/04; C08L 33/24; C08L 35/06; C08L 29/04
See application file for complete search history.

(56) References Cited

U.S. PATENT DOCUMENTS

| | | | |
|---|---|---|---|
| 5,369,168 | A | 11/1994 | Famili et al. |
| 5,605,962 | A | 2/1997 | Suzuki et al. |
| 2013/0131270 | A1 | 5/2013 | Shibutani et al. |
| 2015/0065651 | A1 | 3/2015 | Takamido et al. |
| 2017/0260382 | A1 | 9/2017 | Lee et al. |
| 2017/0292017 | A1 | 10/2017 | Jung et al. |
| 2017/0327680 | A1 | 11/2017 | Shibata et al. |
| 2017/0342254 | A1 * | 11/2017 | Yoo ................. C08K 3/16 |
| 2018/0086906 | A1 | 3/2018 | Eim et al. |
| 2020/0291213 | A1 | 9/2020 | Kang et al. |

FOREIGN PATENT DOCUMENTS

| | | | |
|---|---|---|---|
| CN | 102108180 | A | 6/2011 |
| CN | 104945834 | A | 9/2015 |
| CN | 106366554 | A | 2/2017 |
| CN | 107001760 | A | 8/2017 |
| CN | 107109024 | A | 8/2017 |
| CN | 107880426 | A | 4/2018 |
| EP | 0612806 | A1 | 8/1994 |
| EP | 3187539 | A1 | 7/2017 |
| JP | 105-202263 | A | 8/1993 |
| JP | 2008-246722 | A | 10/2008 |
| JP | 2012-046744 | A | 3/2012 |
| KR | 10-2001-0062986 | A | 7/2001 |
| KR | 2001-0062986 | * | 7/2001 |
| KR | 10-0717547 | B1 | 5/2007 |
| KR | 10-2015-0067743 | A | 6/2015 |
| KR | 2015-0067743 | * | 6/2015 |
| KR | 10-2016-0064864 | A | 6/2016 |
| KR | 10-2017-0047553 | A | 5/2017 |
| KR | 10-2017-0069194 | A | 6/2017 |
| KR | 10-2019-0075458 | A | 7/2019 |
| KR | 10-2025455 | B1 | 9/2019 |
| TW | 201940580 | A | 10/2019 |
| WO | 2014/084453 | A1 | 6/2014 |
| WO | 2019/112239 | A1 | 6/2019 |

OTHER PUBLICATIONS

Denka IP data sheet (Year: 2024).*
Translation of KR 2001-0062986 (Year: 2001).*
Translation of KR2015-0067743 (Year: 2015).*
Yanxian Li, "Coated Abrasives," China Atomic Energy Press, 1st edition, Aug. 2019, p. 91.
Extended European Search Report for related application No. 20879622.7, mailed Apr. 26, 2022.

* cited by examiner

*Primary Examiner* — Robert C Boyle

(57) ABSTRACT

The present invention relates to a thermoplastic resin composition comprising: 100 parts by weight of a base resin comprising a first polymer obtained by graft polymerization of an aromatic vinyl-based monomer and a vinyl cyanide-based monomer to a diene-based rubber polymer, a second polymer comprising maleimide-based monomer units, maleic acid-based monomer units, and aromatic vinyl-based monomer units, and a third polymer comprising aromatic vinyl-based monomer units and vinyl cyanide-based monomer units; and 1 part by weight to 3 parts by weight of a fourth polymer comprising polyvinyl alcohol.

5 Claims, No Drawings

THERMOPLASTIC RESIN COMPOSITION

CROSS-REFERENCE TO RELATED APPLICATION

This application is a National Phase of International Application No. PCT/KR2020/012074 filed on Sep. 7, 2020, which claims priority to and the benefit of Korean Patent Application No. 10-2019-0130863, filed on Oct. 21, 2019, the disclosures of which are incorporated herein by reference in their entirety.

TECHNICAL FIELD

The present invention relates to a thermoplastic resin composition, and particularly to a thermoplastic resin composition including polyvinyl alcohol in an appropriate amount.

BACKGROUND ART

Diene-based graft polymers are graft polymers obtained by polymerizing an aromatic vinyl-based monomer and a vinyl cyanide-based monomer to a diene-based rubber polymer. Diene-based graft polymers have high impact resistance, chemical resistance, thermal stability, colorability, fatigue resistance, stiffness, and processability, as compared to existing high-impact polystyrenes. Due to these properties, thermoplastic resin molded products manufactured from diene-based graft polymers are used as interior and exterior materials for automobiles, office equipment, and parts of various electric and electronic products, and the like.

However, when a thermoplastic resin molded product manufactured from a diene-based graft polymer uses a solvent for painting and deposition, small cracks occur, causing the formation of pinholes in the surface thereof, or peeling of paint occurs.

Therefore, studies have been conducted on the development of a thermoplastic resin composition having excellent chemical resistance and paintability while maintaining excellent physical properties of a diene-based graft polymer.

DESCRIPTION OF EMBODIMENTS

Technical Problem

An object of the present invention is to provide a thermoplastic resin composition with excellent chemical resistance, paintability, tensile strength, heat resistance, and processability.

Technical Solution

According to an aspect of the present invention, there is provided a thermoplastic resin composition comprising: 100 parts by weight of a base resin comprising a first polymer obtained by graft polymerization of an aromatic vinyl-based monomer and a vinyl cyanide-based monomer to a diene-based rubber polymer, a second polymer comprising maleimide-based monomer units, maleic acid-based monomer units, and aromatic vinyl-based monomer units, and a third polymer comprising aromatic vinyl-based monomer units and vinyl cyanide-based monomer units; and 1 part by weight to 3 parts by weight of a fourth polymer including polyvinyl alcohol.

Advantageous Effects of Invention

A thermoplastic resin composition of the present invention has excellent chemical resistance, paintability, tensile strength, heat resistance, and processability. Therefore, when the thermoplastic resin composition is used as interior and exterior materials for automobiles, cracks due to a solvent used for painting can be minimized, and painting defects due to cracks can be minimized.

Mode of Invention

Hereinafter, the present invention will be described in more detail to aid in understanding the present invention.

The terms or words used in the specification and claims should not be construed as being limited to ordinary or dictionary meanings and should be construed as meanings and concepts consistent with the spirit of the present invention based on the principle that the inventors can appropriately define concepts of terms to explain their invention in the best way.

In the present invention, an average particle diameter may be measured using a dynamic light scattering method, and specifically, may be measured using Nicomp 380 manufactured by Particle Sizing Systems. In the present invention, the average particle diameter may refer to an arithmetic average particle diameter in a particle size distribution measured by a dynamic light scattering method, that is, an intensity distribution average particle diameter.

In the present invention, a glass transition temperature may be measured by differential scanning calorimetry.

In the present invention, a diene-based rubber polymer may refer to a polymer prepared by crosslinking a diene-based monomer alone or a diene-based monomer and a comonomer copolymerizable therewith. The diene-based monomer may be one or more selected from the group consisting of 1,3-butadiene, isoprene, chloroprene, and piperylene, and among these, 1,3-butadiene is preferable. The comonomer may include an aromatic vinyl-based monomer, a vinyl cyanide-based monomer, an olefin-based monomer, and the like. The diene-based rubber polymer may include a butadiene rubber polymer, a butadiene-styrene rubber polymer, a butadiene-acrylonitrile rubber polymer, and the like. The diene-based rubber polymer is preferably a butadiene rubber polymer having both excellent impact strength and excellent chemical resistance.

In the present invention, the aromatic vinyl-based monomer may be one or more selected from the group consisting of styrene, α-methyl styrene, α-ethyl styrene, and p-methyl styrene, and among these, styrene is preferable.

In the present invention, the vinyl cyanide-based monomer may be one or more selected from the group consisting of acrylonitrile, methacrylonitrile, phenylacrylonitrile, and α-chloroacrylonitrile, and among these, acrylonitrile is preferable.

In the present invention, the maleimide-based monomer may be one or more selected from the group consisting of maleimide, N-methyl maleimide, N-ethyl maleimide, N-propyl maleimide, N-isopropyl maleimide, N-butyl maleimide, N-isobutyl maleimide, N-t-butyl maleimide, N-lauryl maleimide, N-cyclohexyl maleimide, N-phenyl maleimide, N-(4-chlorophenyl)maleimide, 2-methyl-N-phenyl maleimide, N-(4-bromophenyl)maleimide, N-(4-nitrophenyl)maleimide, N-(4-hydroxyphenyl)maleimide, N-(4-methoxyphenyl)maleimide, N-(4-carboxyphenyl)maleimide, and N-benzyl maleimide, and among these, N-phenyl maleimide is preferable.

In the present invention, the maleic acid-based monomer may be one or more selected from the group consisting of maleic anhydride, maleic acid, maleic monoester, and maleic diester, and among these, maleic anhydride is preferable.

1. Thermoplastic Resin Composition

A thermoplastic resin composition according to an embodiment of the present invention includes: 1) 100 parts by weight of a base resin including a first polymer obtained by graft polymerization of an aromatic vinyl-based monomer and a vinyl cyanide-based monomer to a diene-based rubber polymer, a second polymer including maleimide-based monomer units, maleic acid-based monomer units, and aromatic vinyl-based monomer units, and a third polymer including aromatic vinyl-based monomer units and vinyl cyanide-based monomer units; and 1 part by weight to 3 parts by weight of a fourth polymer including polyvinyl alcohol.

The inventors of the present invention have discovered that the thermoplastic resin composition has improved impact resistance, heat resistance, and processability through the synergistic action of the first polymer and the second polymer, and when the thermoplastic resin composition includes the fourth polymer in an appropriate amount, the stiffness, chemical resistance, paintability, and processability thereof are improved, thus completing the present invention.

Hereinafter, components of the thermoplastic resin composition according to an embodiment of the present invention will be described in detail.

1) Base Resin

The base resin includes: a first polymer obtained by graft polymerization of an aromatic vinyl-based monomer and a vinyl cyanide-based monomer to a diene-based rubber polymer; a second polymer including maleimide-based monomer units, maleic acid-based monomer units, and aromatic vinyl-based monomer units; and a third polymer including aromatic vinyl-based monomer units and vinyl cyanide-based monomer units.

The first polymer may impart excellent impact resistance, excellent heat resistance, and excellent processability to the thermoplastic resin composition through a synergistic action with the second polymer.

The first polymer may be included in the thermoplastic resin composition in an amount of 15 parts by weight to 35 parts by weight, preferably 20 parts by weight to 40 parts by weight, with respect to 100 parts by weight of the base resin. When the above range is satisfied, excellent stiffness, heat resistance, processability, impact resistance, and tensile resistance may be imparted.

In the first polymer, the average particle diameter of the diene-based rubber polymer may be in the range of 200 nm to 400 nm, preferably 250 nm to 300 nm, in order to realize excellent impact resistance and surface gloss.

The first polymer may be a graft polymer obtained by graft polymerization of styrene and acrylonitrile to a butadiene rubber polymer.

The second polymer may be included in the thermoplastic resin composition in an amount of 5 parts by weight to 25 parts by weight, preferably 10 parts by weight to 20 parts by weight, with respect to 100 parts by weight of the base resin. When the above-described range is satisfied, excellent heat resistance, processability, and impact resistance may be imparted to the thermoplastic resin composition.

The second polymer is a copolymer of a maleimide-based monomer, a maleic acid-based monomer, and an aromatic vinyl-based monomer, and may be an N-phenylmaleimide/maleic anhydride/styrene polymer comprising N-phenylmaleimide units, maleic anhydride units, and styrene units.

Since the second polymer should be able to impart excellent heat resistance and processability to the thermoplastic resin composition, the glass transition temperature may be in the range of 180° C. to 210° C., preferably 190° C. to 200° C., and the melt flow index may be in the range of 1 g/10 min to 5 g/10 min, preferably 2 g/10 min to 4 g/10 min, under conditions of 265° C. and 10 kg in accordance with ASTM D1238.

The third polymer may be included in the thermoplastic resin composition in an amount of 50 parts by weight to 70 parts by weight, preferably 55 parts by weight to 65 parts by weight, with respect to 100 parts by weight of the base resin. When the above-described range is satisfied, the first and second polymers are included in the thermoplastic resin composition in appropriate amounts, and thus excellent rigidity, heat resistance, and processability may be imparted to the thermoplastic resin composition.

The third polymer is a copolymer of an aromatic vinyl-based monomer and a vinyl cyanide-based monomer, and may be a styrene/acrylonitrile polymer including styrene units and acrylonitrile units.

2) Fourth Polymer

The fourth polymer includes polyvinyl alcohol. In addition to polyvinyl alcohol, the fourth polymer may include polyvinyl acetate that is not hydrolyzed when polyvinyl alcohol is prepared by hydrolyzing polyvinyl acetate.

Since the fourth polymer includes polyvinyl alcohol, the fourth polymer, although being water-soluble, may have a property of not being dissolved well in an organic solvent mainly used as a solvent for painting and deposition. Thus, the fourth polymer may improve the heat resistance and paintability of the thermoplastic resin composition.

The fourth polymer may be included in the thermoplastic resin composition in an amount of 1 part by weight to 3 parts by weight, preferably 1.5 parts by weight to 2.5 parts by weight, with respect to 100 parts by weight of the base resin. When the above-described range is satisfied, the chemical resistance and paintability of the thermoplastic resin composition may be remarkably improved. On the other hand, when included in an amount that is less than the above-described amount range, the effects of improvement in chemical resistance and paintability of the thermoplastic resin composition are insignificant. When included in an amount that exceeds the above-described range, the chemical resistance and paintability of the thermoplastic resin composition are improved, but the impact resistance, processability, and heat resistance thereof may be remarkably deteriorated.

The fourth polymer may have a weight average molecular weight of 70,000 g/mol to 140,000 g/mol, preferably 85,000 g/mol to 124,000 g/mol. When the above-described range is satisfied, paintability and chemical resistance may be remarkably improved.

Hereinafter, the present invention will be described in detail with reference to the following examples in such a way that those of ordinary skill in the art to which the present invention pertains may easily carry out the present invention. However, the present invention may be embodied in various different forms, and is not limited to the examples described herein.

EXAMPLES AND COMPARATIVE EXAMPLES

Descriptions of components used in the following examples and comparative examples are as follows.

First polymer: DP270 manufactured by LC CHEM LTD. (graft polymer obtained by graft polymerization of styrene and acrylonitrile to a butadiene rubber polymer (average particle diameter: 300 nm)

Second polymer: MSNB manufactured by DENKA (an n-phenyl maleimide/maleic anhydride/styrene copolymer)

Third polymer: 92 HR manufactured by LG CHEM LTD. (a styrene/acrylonitrile copolymer)

Fourth polymer: polyvinyl alcohol (Manufacturer: Sigma Aldrich. Product Number: 363146, weight average molecular weight: 85,000 g/mol to 124,000 g/mol, hydrolysis: 99% or more)

The above-described components were mixed according to the contents shown in the following table and stirred to prepare thermoplastic resin compositions.

Experimental Example 1

The thermoplastic resin compositions of the examples and comparative examples were extruded to prepare pellets. A physical property of the pellets was evaluated using the method described below, and the results thereof are shown in the table below.

① Melt flow index (g/10 min): Measurement was performed under conditions of 220° C. and 10 kg in accordance with ASTM D1238.

Experimental Example 2

The thermoplastic resin compositions of the examples and comparative examples were extruded and injected to prepare specimens. The physical properties of the specimens were evaluated using the methods described below, and the results thereof are shown in the following table.

② Chemical resistance (seconds): A specimen having a size of 200 mm×12.7 mm×3.2 mm was fixed to a curvature jig having a strain of 1.1%, and a 1 cc thinner was applied onto the specimen, and then the time taken for cracks to occur in the specimen was measured. When no cracks occurred until 600 seconds had elapsed after the application of the thinner, it was determined that chemical resistance evaluation was passed. Those that passed the chemical resistance evaluation were described as >600.

③ Paintability: A specimen having a size of 10 cm×10 cm was degreased using isopropyl alcohol, and then a black paint was sprayed onto the specimen. When 5 minutes had elapsed after spraying the paint, a clear paint was sprayed and dried in an oven at 85° C. to visually observe whether pin-holes were generated, and the paintability thereof was evaluated.

A: Excellent, B: Fair, C: Poor

④ Tensile strength (kgf/cm²): Measurement was performed in accordance with ASTM D638.

⑤ Heat deflection temperature (° C.): In accordance with ASTM D648-7, measurement was performed under conditions of ¼ inch, 18.6 kgf, and 120° C./hr.

TABLE 1

| Classification | Comparative Example | | Example | | | | Comparative Example | |
|---|---|---|---|---|---|---|---|---|
| | 1 | 2 | 1 | 2 | 3 | 4 | 3 | 4 |
| First polymer | 25 | 25 | 25 | 25 | 25 | 25 | 25 | 25 |
| Second polymer | 15 | 15 | 15 | 15 | 15 | 15 | 15 | 0 |
| Third polymer | 60 | 60 | 60 | 60 | 60 | 60 | 60 | 75 |
| Fourth polymer | 0 | 0.5 | 1 | 1.5 | 2 | 3 | 4 | 1 |
| Flow index | 9.1 | 8.9 | 9 | 8.7 | 8.8 | 8.6 | 6.9 | 20.9 |
| Chemical resistance | 238 | 350 | >600 | >600 | >600 | >600 | >600 | >600 |
| Paintability | C | C | A | A | A | A | A | A |
| Tensile strength | 482 | 480 | 475 | 475 | 469 | 469 | 440 | 498 |
| Heat deflection temperature | 97.5 | 97.0 | 97.0 | 97.3 | 97.1 | 96.9 | 96.1 | 87 |

First polymer: DP270 manufactured by LC CHEM LTD. (graft polymer obtained by graft polymerization of styrene and acrylonitrile to a butadiene rubber polymer (average particle diameter: 300 nm)
Second polymer: MSNB manufactured by DENKA (an n-phenyl maleimide/maleic anhydride/styrene copolymer)
Third polymer: 92HR manufactured by LG CHEM LTD. (a styrene/acrylonitrile copolymer)
Fourth polymer: polyvinyl alcohol (Manufacturer: Sigma Aldrich. weight average molecular weight: 85,000 g/mol to 124,000 g/mol, hydrolysis: 99% or more)

Referring to the table, it was confirmed that Examples 1 to 4 including 1 part by weight to 3 parts by weight of polyvinyl alcohol had excellent chemical resistance, paintability, tensile strength, and heat deflection temperature. It was also confirmed that, since the melt flow index was at an appropriate level, processability was also excellent. In contrast, it was confirmed that Comparative Example 1 not including polyvinyl alcohol and Comparative Example 2 including a small amount of polyvinyl alcohol had deteriorated chemical resistance and paintability. From these results, it could be predicted that, when molded products manufactured from Comparative Examples 1 and 2 are used for painting, defects or peeling of paint and the like occur.

It was confirmed that Comparative Example 3 including excess polyvinyl alcohol exhibited excellent chemical resistance and paintability, but flow index, tensile strength, and heat deflection temperature were lowered. From these results, it could be predicted that a molded article manufactured from Comparative Example 3 exhibits deteriorated processability, rigidity, and heat resistance.

It was also confirmed that Comparative Example 5 not including the second polymer exhibited excellent chemical resistance, paintability, and tensile strength, but a melt flow index was too high and a heat deflection temperature was lowered. From these results, it could be predicted that a molded product manufactured from Comparative Example 5 exhibits deteriorated processability and heat resistance.

The invention claimed is:
1. A thermoplastic resin composition comprising:
100 parts by weight of a base resin comprising a first polymer obtained by graft polymerization of an aromatic vinyl-based monomer and a vinyl cyanide-based monomer to a diene-based rubber polymer, a second polymer comprising maleimide-based monomer units, maleic acid-based monomer units, and aromatic vinyl-based monomer units, and a third polymer including aromatic vinyl-based monomer units and vinyl cyanide-based monomer units; and
1 part by weight to 3 parts by weight of a fourth polymer comprising polyvinyl alcohol,
wherein the thermoplastic resin composition comprises, with respect to 100 parts by weight of the base resin, 20 parts by weight to 40 parts by weight of the first polymer, 5 parts by weight to 25 parts by weight of the second polymer, and 50 parts by weight to 70 parts by weight of the third polymer, and wherein the fourth polymer has a weight average molecular weight of 70,000 g/mol to 140,000 g/mol.

2. The thermoplastic resin composition of claim 1, wherein the thermoplastic resin composition comprises: 100 parts by weight of the base resin; and 1.5 parts by weight to 2.5 parts by weight of the fourth polymer.

3. The thermoplastic resin composition of claim 1, wherein the diene-based rubber polymer of the first polymer has an average particle diameter of 200 nm to 400 nm.

4. The thermoplastic resin composition of claim 1, wherein the second polymer has a glass transition temperature of 180° C. to 210° C.

5. The thermoplastic resin composition of claim 1, wherein the second polymer has a melt flow index of 1 g/10 min to 5 g/10 min under conditions of 265° C. and 10 kg in accordance with ASTM D1238.

* * * * *